US012030780B2

(12) United States Patent
Luz-Minguez et al.

(10) Patent No.: US 12,030,780 B2
(45) Date of Patent: Jul. 9, 2024

(54) NANOSTRUCTURED SILICON CARBONACEOUS COMPOSITE MATERIAL AND METHODS FOR PRODUCING THE SAME

(71) Applicant: Research Triangle Institute, Research Triangle Park, NC (US)

(72) Inventors: Ignacio Luz-Minguez, Durham, NC (US); Mustapha Soukri, Cary, NC (US); David Dausch, Research Triangle Park, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 202 days.

(21) Appl. No.: 17/393,660

(22) Filed: Aug. 4, 2021

(65) Prior Publication Data
US 2022/0041454 A1    Feb. 10, 2022

Related U.S. Application Data

(60) Provisional application No. 63/062,457, filed on Aug. 7, 2020.

(51) Int. Cl.
*C01B 33/025* (2006.01)
*C07F 3/02* (2006.01)
(Continued)

(52) U.S. Cl.
CPC .............. *C01B 33/025* (2013.01); *C07F 3/02* (2013.01); *H01M 4/362* (2013.01); *H01M 4/386* (2013.01);
(Continued)

(58) Field of Classification Search
CPC ........ C01B 33/025; C07F 3/02; H01M 4/362; H01M 4/386; H01M 10/0525;
(Continued)

(56) References Cited

U.S. PATENT DOCUMENTS 9,765,271 B2    9/2017  Myrick
9,786,940 B2    10/2017 Langley
(Continued)

FOREIGN PATENT DOCUMENTS

AU    2014278253 B2    12/2014
AU    2017239429 B2    9/2017
(Continued)

OTHER PUBLICATIONS

Miricioiu et al. "Fly Ash, from Recycling to Potential Raw Material for Mesoporous Silica Synthesis", Nanomaterials, 2020, 10, p. 1-14. (Year: 2020).*

(Continued)

*Primary Examiner* — Melissa S Swain
*Assistant Examiner* — Catriona M Corallo
(74) *Attorney, Agent, or Firm* — NK Patent Law

(57) ABSTRACT

Described herein is a nanostructured silicon carbonaceous composite material and methods for producing the same. The methods include formation of a metal organic framework/silica (MOF/SiO$_2$) intermediate material and conversion of the MOF/SiO$_2$ intermediate material to the nanostructured silicon carbonaceous composite material. Relatively inexpensive and/or recycled materials can be used as precursors in manufacturing the nanostructured silicon carbon composition material, which can be used in various applications, including as silicon anode material in a lithium-ion battery.

9 Claims, 9 Drawing Sheets

(51) Int. Cl.
  *H01M 4/36* (2006.01)
  *H01M 4/38* (2006.01)
  *H01M 10/0525* (2010.01)
  *B82Y 30/00* (2011.01)
  *B82Y 40/00* (2011.01)

(52) U.S. Cl.
  CPC ......... *H01M 10/0525* (2013.01); *B82Y 30/00* (2013.01); *B82Y 40/00* (2013.01); *C01P 2002/01* (2013.01); *C01P 2002/82* (2013.01); *C01P 2004/64* (2013.01); *C01P 2004/80* (2013.01); *C01P 2006/14* (2013.01); *C01P 2006/40* (2013.01)

(58) Field of Classification Search
  CPC ..... B82Y 30/00; B82Y 40/00; C01P 2002/01; C01P 2002/82; C01P 2004/64; C01P 2004/80; C01P 2006/14; C01P 2006/40
  See application file for complete search history.

(56) References Cited

U.S. PATENT DOCUMENTS

| | | |
|---|---|---|
| 9,799,883 B2 | 10/2017 | Upreti |
| 10,090,513 B2 | 10/2018 | Canham et al. |
| 10,147,950 B2 | 12/2018 | Sakshaug et al. |
| 10,243,213 B2 | 3/2019 | Upreti |
| 10,608,254 B2 | 3/2020 | Sakshaug et al. |
| 10,629,900 B2 | 4/2020 | Dutta et al. |
| 2014/0227548 A1 | 8/2014 | Myrick |
| 2014/0363635 A1 | 12/2014 | Upreti |
| 2015/0104705 A1 | 4/2015 | Canham et al. |
| 2016/0045841 A1 | 2/2016 | Kaplan et al. |
| 2017/0149059 A1 | 5/2017 | Dutta et al. |
| 2017/0170477 A1 | 6/2017 | Sakshaug et al. |
| 2017/0373317 A1 | 12/2017 | Upreti |
| 2019/0169036 A1 | 6/2019 | Minguez et al. |
| 2019/0296354 A1 | 9/2019 | Upreti |
| 2019/0326593 A1 | 10/2019 | Ozkan et al. |
| 2020/0014024 A1 | 1/2020 | Wagner et al. |
| 2020/0020935 A1 | 1/2020 | Costantino et al. |
| 2020/0152983 A1 | 5/2020 | Sakshaug et al. |
| 2020/0220170 A1 | 7/2020 | Dutta et al. |

FOREIGN PATENT DOCUMENTS

| | | |
|---|---|---|
| AU | 2018217309 A1 | 9/2018 |
| CA | 2927222 A1 | 12/2014 |
| CA | 3031029 A1 | 2/2018 |
| CN | 103952716 A | 7/2014 |
| CN | 105098148 A | 11/2015 |
| CN | 105531853 A | 4/2016 |
| CN | 108199030 A | 6/2018 |
| CN | 108290740 A | 7/2018 |
| CN | 110402500 A | 11/2019 |
| CN | 110582823 A | 12/2019 |
| EP | 3008767 A1 | 4/2016 |
| EP | 3380436 A1 | 10/2018 |
| EP | 3593369 A1 | 1/2020 |
| GB | 2504593 A | 2/2014 |
| IN | 201817019648 A | 9/2018 |
| JP | 2020514231 A | 5/2020 |
| KR | 20150035816 A | 4/2015 |
| KR | 20160018705 A | 2/2016 |
| KR | 20180087340 A | 8/2018 |
| KR | 20180113187 A | 10/2018 |
| KR | 20190040490 A | 4/2019 |
| KR | 20190122805 A | 10/2019 |
| WO | 2012176994 A2 | 12/2012 |
| WO | 2014201049 A1 | 12/2014 |
| WO | 2017040299 A1 | 3/2017 |
| WO | 2017091543 | 6/2017 |
| WO | 2017091543 A1 | 6/2017 |
| WO | 2018165610 A1 | 9/2018 |

OTHER PUBLICATIONS

Zhang et al. "Waste PET as a Reactant for Lanthanide MOF Synthesis and Application in Sensing of Picric Acid", Polymers, 2019, 11, p. 1-9. (Year: 2019).*

Ma et al. "Functional Metal Organic Framework/SiO2 Nanocomposites: From Versatile Synthesis to Advanced Applications", Polymers, 2019, 11, p. 1-22. (Year: 2019).*

Majeed et al. "Metal-Organic Frameworks-Derived Mesoporous Si/SiOx@NC Nanospheres as a Long-Lifespan Anode Material for Lithium-Ion Batteries". Chem. Eur. J. 2019, 25, p. 11991-11997. (Year: 2019).*

Campbell, Brennan, et al., "Carbon-Coated, Diatomite-Derived Nanosilicon as a High Rate Capable Li-ion Battery Anode", Scientific Reports, vol. 6, Article No. 33050, Oct. 7, 2016, 7 pages.

Li, Changling, et al., "Silicon Derived from Glass Bottles as Anode Materials for Lithium Ion Full Cell Batteries", Scientific Reports, vol. 7, Article No. 917, Apr. 19, 2017, 11 pages.

Choi, Mingu, et al., "Waste Windshield-Derived Silicon/Carbon Nanocomposites as High-Performance Lithium-Ion Battery Anodes", Scientific Reports, vol. 8, Article No. 960, Jan. 17, 2018, 10 pages.

Weinrich, Henning, et al., "Silicon and Iron as Resource-Efficient Anode Materials for Ambient-Temperature Metal-Air Batteries: A Review", Materials, vol. 12, Issue 13, Jul. 2, 2019, 37 pages.

Yilmaz, Gamze, et al., "Atomic- and Molecular-Level Design of Functional Metal-Organic Frameworks (MOFs) and Derivatives for Energy and Environmental Applications", Advanced Science, vol. 6, Issue 21, Sep. 1, 2019, 33 pages.

Lagae-Capelle, Eleonore, et al., "Combining Organic and Inorganic Wastes to Form Metal-Organic Frameworks", Materials, vol. 13, Issue 2, Jan. 17, 2020, 5 pages.

Nowak, Andrzej P., et al., "Diatoms Biomass as a Joint Source of Biosilica and Carbon for Lithium-Ion Battery Anodes", Materials, vol. 13, Issue 7, Apr. 3, 2020, 11 pages.

Clemens, Dr. Liedel, "Sustainable Battery Materials from Biomass", Chemsuschem, vol. 13, Issue 9, May 8, 2020, 44 pages.

* cited by examiner

NANOSTRUCTURED SILICON CARBONACEOUS COMPOSITE MATERIAL AND METHODS FOR PRODUCING THE SAME

CROSS-REFERENCE TO RELATED APPLICATIONS

This application claims the benefit of priority of U.S. Provisional Patent Application No. 63/062,457, filed on Aug. 7, 2020.

TECHNICAL FIELD

A nanostructured silicon carbonaceous composite material and methods for producing the same using metal organic framework (MOF)-assisted synthesis are described herein. Relatively inexpensive and/or recycled materials can be used as precursors in manufacturing the nanostructured silicon carbon composition material, which can be used as a silicon anode material in a lithium-ion battery.

BACKGROUND

Silicon nanomaterials can be used in many applications, including size-dependent photoluminescence, photovoltaics, field-effect transistors, photocatalysts, hydrogen storage and generation, and Li-ion battery anodes.

Silicon (Si) is an attractive active material in Li-ion battery anodes due to its low cost, high abundance, non-toxicity, and high gravimetric and volumetric capacity, which are theoretically as much as 3579 mAh/g and 8335 mAh/cm$^3$, respectively. Silicon offers significant energy storage improvement over graphite, which has theoretical gravimetric and volumetric capacity of 372 mAh/g and 830 mAh/mL, respectively.

Silicon can alloy with a large number of Li-ions during lithiation, which results in significant volume expansion of upwards of 300% during electrochemical lithiation. The lithium-induced mechanical stresses during alloying with subsequent contraction during de-alloying can cause Si to fracture, which leads to the pulverization of active materials and the deterioration of the conductive network. The repeated expansion and shrinkage during lithiation and de-lithiation can destroy the integrity of the solid electrolyte interphase (SEI), while increasing the decomposition of electrolyte to reform SEI on the newly exposed Si surface.

Various strategies have been tried to reduce the structural volume change and optimize the electrochemical performance of Si anodes. Reducing the dimensions of silicon structures has been used to mitigate capacity fading due to cracking of Si during lithiation and de-lithiation. Nanostructures, such as Si nanoparticles, double walled Si nanotubes, and three-dimensional (3D) porous nano-Si can be advantageous in reducing volume expansion of Si due to the void spaces generated by their porous or hollow structures. Carbon coatings on the Si anodes can improve their cycling stability. For example, carbon coatings deposited via thermal decomposition of a carbon precursor can act as buffer layers to accommodate the volume expansion of Si. In-situ polymerized conductive polymer coverings with tunable conductivity, diverse monomer chemistry and surface compatibility with electrolyte function can also enhance the rate capability of the electrodes.

Methods for producing nanostructured Si with suitable electrochemical performance as anode materials are available. However, many methods for synthesizing Si nanostructures are limited to costly raw materials, complex procedures, and low yield of active material. For example, pyrolysis of silane/halo-silane/polysilane precursors via chemical vapor deposition (CVD) can produce various nanostructured silicon, such as nanospheres, nanowires and nanotubes. However, the pyrolysis process consumes a large amount of energy and requires expensive and highly toxic precursors, which make it non-economical and impractical for mass manufacturing. In another example, electrochemical anodization of crystalline wafers in toxic acidic environment has been employed to produce porous silicon. Silicon wafers have also been etched into tunable silicon nanowires via metal-assisted templated and non-templated approaches. However, the high-cost electronic grade wafers coupled with the milligram-per-wafer yield of active material limit on an industry level.

Magnesiothermic reduction has been shown to reduce $SiO_2$ into nanostructured silicon at relatively low operating temperatures (~650° C., below the melting point of Si). In comparison, carbothermal reduction has been used to produce metallurgical silicon at a high temperature (>2000° C.). Carbothermal reduction is a high energy-consuming process that melts or liquefies Si, thus destroying the original morphology of $SiO_2$. NaCl can be added to effectively scavenge a large amount of heat generated during a highly exothermic reaction, thus preventing excess heat from surpassing the melting point of Si. Molten salt of $AlC_3$ to $SiCl_4$ can decrease the reduction temperature to 200° C., which preserves the original structure of $SiO_2$.

There is a need for new processes to prepare nanomaterials and composites that may be used as electrode active materials that exhibit enhanced performance, such as stability over multiple charge/discharge cycles. Moreover, new processes that use recyclable and environmentally friendly materials are desirable.

SUMMARY OF THE DISCLOSURE

A nanostructured silicon carbonaceous composite material and methods for producing the same are described. The methods include formation of a metal organic framework/silica (MOF/$SiO_2$) intermediate material and conversion of the MOF/$SiO_2$ intermediate material to the nanostructured silicon carbonaceous composite material. Relatively inexpensive and/or recycled materials can be used in manufacturing the nanostructured silicon carbon composition material, which can be used in various applications, including as silicon anode material in a lithium-ion battery.

In a first aspect of the invention, a method for making a nano-crystalline metal organic framework/silica intermediate material includes contacting a metal-silica precursor with an organic ligand in water to form an aqueous mixture, and heating the aqueous mixture at a temperature ranging from about 25° C. to 300° C. to form the nano-crystalline metal organic framework/silica intermediate material. The metal-silica precursor may comprise a metal oxide confined in silica or a metal silicate. The metal oxide confined in silica may be a synthetic metal oxide. The metal silicate may be a mineral metal silicate. The organic ligand may comprise PET derived from a plastic bottle, preferably a recycled plastic bottle.

In a second aspect of the invention, a method of making a nanostructured silicon carbonaceous composite material includes contacting a metal-silica precursor with an organic ligand in water to form an aqueous mixture, heating the aqueous mixture at a temperature ranging from about 25° C. to 300° C. thereby forming the nano-crystalline metal organic framework/silica intermediate material, and contacting the nano-crystalline metal organic framework/silica intermediate material with magnesium at a temperature ranging from about 600° C. to 800° C. thereby forming the nanostructured silicon carbonaceous composite material.

BRIEF DESCRIPTION OF THE DRAWINGS

The foregoing aspects and other features of the disclosure are explained in the following description, taken in connection with the accompanying drawings, wherein.

DETAILED DESCRIPTION

Figure 1:
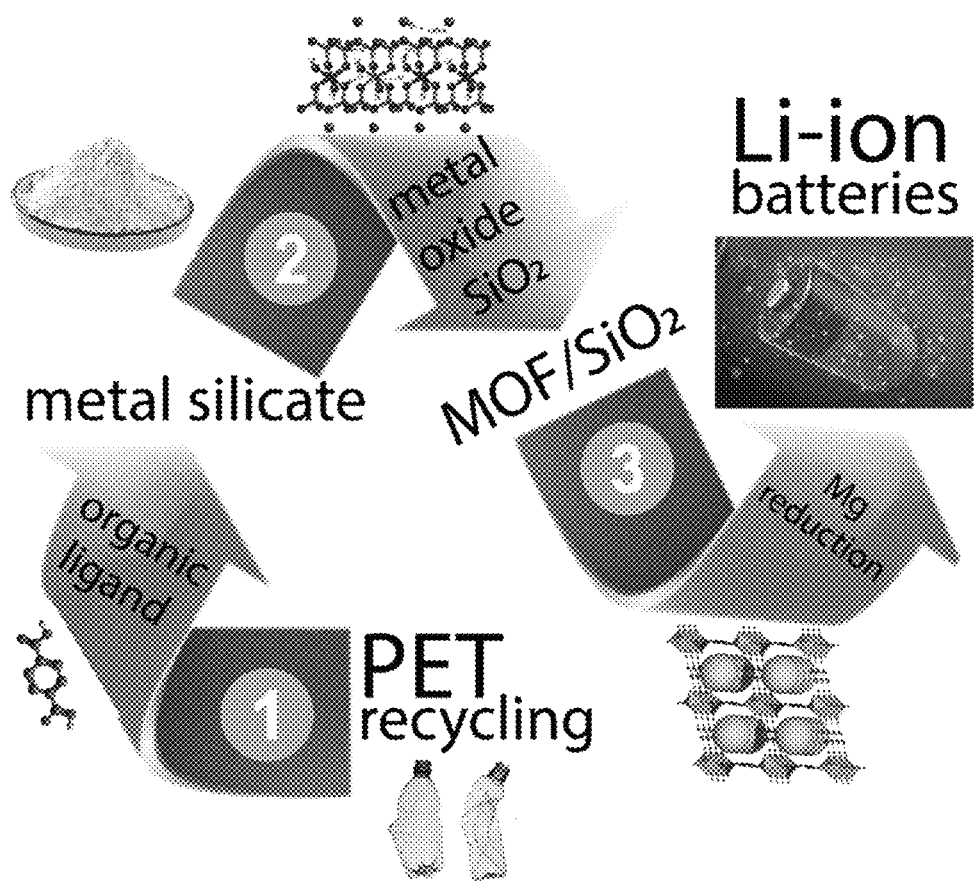
FIG. 1 is a schematic representation of an exemplary synthesis process for the nanostructured silicon carbonaceous composite material.

For the purposes of promoting an understanding of the principles of the present disclosure, reference will now be made to preferred embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles "a" and "an" are used herein to refer to one or to more than one (i.e. at least one) of the grammatical object of the article. By way of example, "a nanostructured silicon carbon composition material" means at least one nanostructured silicon carbon composition material and can include more than one nanostructured silicon carbon composition material.

Throughout the specification, the terms "about" and/or "approximately" may be used in conjunction with numerical values and/or ranges. The term "about" is understood to mean those values near to a recited value. For example, "about 40 [units]" may mean within +/−25% of 40 (e.g., from 30 to 50), within +/−20%, +/−15%, +/−10%, +/−9%, +/−8%, +/−7%, +/−6%, +/−5%, +/−4%, +/−3%, +/−2%, +/−1%, less than +/−1%, or any other value or range of values therein or there below. Furthermore, the phrases "less than about [a value]" or "greater than about [a value]" should be understood in view of the definition of the term "about" provided herein. The terms "about" and "approximately" may be used interchangeably.

Throughout the specification, numerical ranges are provided for certain quantities. It is to be understood that these ranges comprise all subranges therein. Thus, the range "from 50 to 80" includes all possible ranges therein (e.g., 51-79, 52-78, 53-77, 54-76, 55-75, 60-70, etc.). Furthermore, all values within a given range may be an endpoint for the range encompassed thereby (e.g., the range 50-80 includes the ranges with endpoints such as 55-80, 50-75, etc.).

As used herein, the verb "comprise" as is used in this description and in the claims and its conjugations are used in its non-limiting sense to mean that items following the word are included, but items not specifically mentioned are not excluded.

Throughout the specification the word "comprising," or variations such as "comprises" or "comprising," will be understood to imply the inclusion of a stated element, integer or step, or group of elements, integers or steps, but not the exclusion of any other element, integer or step, or group of elements, integers or steps. The present disclosure may suitably "comprise", "consist of", or "consist essentially of", the steps, elements, and/or reagents described in the claims.

It is further noted that the claims may be drafted to exclude any optional element. As such, this statement is intended to serve as antecedent basis for use of such exclusive terminology as "solely", "only" and the like in connection with the recitation of claim elements, or the use of a "negative" limitation.

Unless defined otherwise, all technical and scientific terms used herein have the same meanings as commonly understood by one of ordinary skill in the art to which this disclosure belongs. Preferred methods, devices, and materials are described, although any methods and materials similar or equivalent to those described herein can be used in the practice or testing of the present disclosure. All references cited herein are incorporated by reference in their entirety.

Described herein is a nanostructured silicon carbonaceous composite material and methods for producing the silicon carbonaceous composite material. The methods include formation of a metal organic framework/silica (MOF/SiO$_2$) intermediate material and conversion of the MOF/SiO$_2$ intermediate material to the nanostructured silicon carbonaceous composite material. As will be described in more detail herein below, relatively inexpensive and/or recycled materials can be used as precursors in manufacturing the nanostructured silicon carbon composition material, which can be used in various applications. However, the use primarily described herein is that of a silicon anode material in a lithium-ion battery.

A process to prepare nanostructured silicon carbonaceous composite material (for example, silicon/silicon-carbide/graphite (Si/SiC/G)) from relatively inexpensive and recycled precursors is described herein. In embodiments, high concentrations (>50 wt. %) of Si nanoparticles (<5 nm) can be intimately stabilized within a stable porous matrix based on silicon carbide and/or graphite. Advantageously, in embodiments, tunable formulations and tailored nanostructures that can boost the energy capacity of lithium-ion batteries over 50% with low energy fade (<20% energy) for more than 1,000 full charge-discharge cycles can be manufactured using the described methods.

Inexpensive and recycled precursors are used to prepare metal organic framework/silica (MOF/SiO$_2$) intermediates in a first step, which can then be converted into carbon/Si composite materials using a magnesiothermic reduction process, in which the MOF acts as a precursor of the resulting carbonaceous species (graphite and carbide) and silica is the source of silicon.

For preparation of the MOF/SiO$_2$ intermediate, inexpensive metal silicate precursors can be selected from a variety of mineral sources (i.e. clay minerals) and waste feedstocks (i.e. asbestos and fly ash). The organic ligand utilized for MOF synthesis can be generated in-situ from polyethylene terephthalate (PET) from recycled plastic bottle waste. Advantageously, formulation and nanostructure of the resulting silicon carbonaceous composite materials can be tailored by selecting the source of metal silicate precursors (e.g., halloysite, kaolinite, asbestos, fly ash) and the synthesis conditions (concentrations, temperature, pressure and additives). The tunable composition and tailored nanostructure can boost the battery energy capacity by over 50% by reducing the Si nanoparticles size below 5 nm while increasing its concentration beyond 50 wt %, due to the excellent dispersion on the graphitic carbon porous matrix achieved by using a MOF during synthesis.

Increased energy capacity enables the anode to have a reduced thickness, permitting the battery to be charged more quickly. A porous graphite and silicon carbide scaffolding enabled by the MOF precursor can provide room for silicon to expand and contract during lithiation and de-lithiation without contacting the electrolyte. Advantageously these features enable batteries made with the nanostructured silicon carbonaceous composite material described herein to perform with low energy fade (<20% energy) for many charge-discharge cycles. In embodiments, a battery made with the nanostructured silicon carbonaceous composite material can perform with low energy fade for more than 1,000 full charge-discharge cycles.

Preparing nanostructured silicon carbonaceous composite material by using waste and recycled feedstocks will have positive environmental, economic, and sustainability impacts. Exemplary benefits include reducing use of virgin resources, lowering greenhouse gas emissions, reducing cost of waste disposal, and increasing competition (e.g. lowering cost) for a high value product (anode material for LIBs).

In an exemplary embodiment, the method includes two steps, which can be represented with the following chemical reactions:

(Step 1) $M_w Si_x O_y (OH)_z + PET \rightarrow MOF/SiO_2 + EG$,  \qquad 1)

Wherein: M=metal;
PET (polyethyleneterephthalate),
MOF=$M_x(BDC)_y$,
BDC=benzenedicarboxylate,
EG=ethyleneglycol)

(Step 2) $MOF/SiO_2 + Mg \rightarrow C/Si + MgO + MO_x$ \qquad 2)

The exemplary process is also illustrated in FIG. 1, which is a schematic representation of the synthesis process.

Step 1—Formation of a Metal Organic Framework/Silica (MOF/SiO$_2$) Intermediate Material Metal organic frameworks (MOFs) or hybrid porous organic/inorganic materials are a class of crystalline solids organized by the self-assembly of organic linkers with metal ions or clusters. They have strong potential to be used for a wide range of applications due to their specific properties (such as stability, large porosity, well-defined active sites, highly-designed functionality and high surface area).

MOFs have been prepared using commercially-available depolymerized PET as a source of organic ligands to build various MOFs, based on Zr, Cu, Zn, Cr, Al, Ga, and V, with a high purity. Additionally, lithium battery waste has been used as a source of metal ions for the synthesis of Al MOFs, Ni—Mn MOFs, and Cu MOFs. It is desirable to continue developing methods using recycled or waste materials in the production of MOFs.

A MOF synthesis process is described in U.S. Application Publication No. 2019/0169036 (the '036 publication), which is incorporated by reference herein. The '036 publication describes 'in situ' crystallization of metal organic frameworks (MOFs) within mesoporous materials via self-assembly of pre-impregnated MOF precursors (metal and organic ligand) in the cavities of mesoporous materials in the absence of solvent. Hybrid compounds comprising nanocrystalline metal organic frameworks (MOFs) embedded within mesoporous materials (MPM) can be produced using methods described the '036 publication.

The hybrid material intermediates can be designed to exhibit elevated MOF loading (up to 35-40%), excellent MOF dispersion and homogeneity, tunable hierarchical micro (MOF; ranging from 0.5-5.0 nm) and meso (MPM; ranging from 2-50 nm) pore size distribution, elevated surface areas (up to 900-1200 m$^2$/g), nano-metric MOF particles (below 30 nm), enhanced attrition resistance, good fluidizability as well as handling (100-500 μm) The solid phase crystallization technique enables homogeneous growth of different MOF structures with a series of commercially available mesoporous materials regardless of their nature (silica, alumina, zeolite, carbon, polymer, etc.), pore architecture (size, pore distribution, etc.) or surface functionality (acidic, basic, etc.). The present disclosure is primarily focused on the use of silica as a mesoporous material in the preparation of MOF/SiO$_2$ intermediate materials. The absence of solvent during the crystallization restricts the crystal growth, size, and mobility to the void space (inside the pores) of the mesoporous material where the precursors were confined. Nanostructured MOF/SiO$_2$ intermediate materials prepared via solid state crystallization offer a large variety of MOF loadings and compositions, and SiO$_2$ pore architecture and particle morphology.

In addition to solid state crystallization by impregnation of ligand and metal salt in SiO$_2$, alternative methods are available for preparing MOF/SiO$_2$ intermediate materials. Preparation methods also include solid state crystallization using metal oxides in SiO$_2$ that has been previously prepared by impregnation and calcination of metal salts, followed by exposure to the ligand and use of natural metal silicates that already contain a source of MOF (metal) and SiO$_2$ (silicates).

Additionally, relatively inexpensive mineral materials such as metal silicate precursors in the form of clay materials or waste feedstock (e.g., asbestos and fly ash) can be simultaneously used as the source for both silica and metal organic framework for producing the hybrid MOF/SiO$_2$.

The solid state crystallization method for preparing MOF/SiO$_2$ intermediate materials comprises a multi-step impregnation of saturated aqueous solutions containing MOF precursors: metal salt and ligand. In preparation methods, the ligand can be provided in three different forms: salt, acid and PET. If PET is used, it is used as is to produce terephthalic acid in situ. An acidification step between the initial impregnation of the ligand salt solution and the metal salt solution within the SiO$_2$ cavities is performed to prevent the formation of non-porous coordination polymers due to the fast polymerization rates upon addition of the metal salts in solution even at room temperature.

The method can comprise i) contacting an aqueous solution of an organic ligand salt with mesoporous SiO$_2$ to form an impregnated mesoporous SiO$_2$, ii) treating the impregnated mesoporous SiO$_2$ with an aqueous acidic solution to form an impregnated mesoporous $SiO_2$, iii) contacting an aqueous solution of a metal precursor with the impregnated $SiO_2$ to form an impregnated mesoporous metal organic framework precursor, and iv) heating the impregnated mesoporous metal organic framework precursor in the absence of a solvent or exposing the impregnated mesoporous metal organic framework precursor to a volatile vapor in the absence of a solvent to form a MOF/$SiO_2$ hybrid material intermediate, wherein the hybrid material intermediate comprises a nano-crystalline metal organic framework (MOF) embedded within the mesoporous $SiO_2$.

A first alternative method to prepare MOF/$SiO_2$ intermediate material comprises the impregnation or confinement of an aqueous solution of a metal salt of the formula M+y(B)y on or in mesoporous $SiO_2$ to form a metal oxide impregnated mesoporous $SiO_2$ (upon heating treatment under air at up to 500° C.) having the formula M+y(O)y/$SiO_2$ where M is a metal and each y is independently a whole number; contacting the metal oxide impregnated mesoporous $SiO_2$ with (i) an aqueous solution of an organic ligand of the formula Ax(L-x) to form an impregnated MOF/$SiO_2$ precursor of the formula [M+y(O)y][Ax(L-x)]/$SiO_2$, (ii) an organic solvent of a solution of a ligand Hx(L-x), (iii) or an aqueous suspension of a ligand Hx(L-x) to form an impregnated MOF/$SiO_2$ precursor of the formula [M+y(O)y][Hx(L-x)]/$SiO_2$, where L is a ligand, A is a counter ion and each x is independently a whole number; and heating the mixture to temperatures between room temperature and 250° C. (depending on the situation) for a period of time (from a few hours to a few days) to form a hybrid intermediate material of the formula (M+yL-x)-$SiO_2$; wherein the hybrid material comprises a nano-crystalline metal organic framework (MOF) embedded within the mesoporous silica. The ligand can comprise a ligand salt, ligand acid, or PET as a source of terephthalic acid. In one embodiment, an aqueous solution of an organic ligand salt of the formula Ax(L-x) is used to form an impregnated MOF/$SiO_2$ precursor of the formula [M+y(O)y][Ax(L-x)]/$SiO_2$. In another embodiment, an organic solvent of a solution of a ligand Hx(L-x) is used to form an impregnated MOF/$SiO_2$ precursor of the formula [M+y(O)y][Hx(L-x)]/$SiO_2$. In another embodiment, recycled PET is used to form a metal organic framework $SiO_2$ precursor. Heating is performed at temperatures ranging from room temperature up to 250° C.

An additional alternative method is the same as the first alternative method but uses mineral metal silicates instead of metal oxides impregnated or confined on mesoporous silica.

The MOF formation method may combine steps rather than performing all steps separately and sequentially. For example, in embodiments, an aqueous solution of an organic ligand can be contacted with an aqueous solution of a metal precursor and a mesoporous material sequentially or simultaneously. In alternative embodiments, the organic ligand may be provided in the form of a solid material (for example, plastic bottles) that are contacted with a metal silicate precursor material (e.g., halloysite), water, and an aqueous acidic solution to form a MOF/$SiO_2$ precursor mixture precursor, which is heated (or room temperature) in the presence or the absence of a solvent (primarily $H_2O$) or exposed to a volatile vapor in the absence of a solvent to form a hybrid material intermediate, represented by MOF/$SiO_2$. During the formation of the impregnated mesoporous metal organic framework precursor, an organic solvent may be used. Exemplary organic solvents include, but are not limited to, methanol, ethanol, tetrahydrofuran, N,N-dimethylformamide, acetonitrile, acetone, and the like.

The following schematic reaction represents an exemplary method for preparing an exemplary MOF/$SiO_2$ intermediate: $M_wSi_xO_y(OH)_z$+PET→MOF/$SiO_2$+EG. In the reaction, M is a metal; PET is polyethyleneterephthalate, which may be provided by recycled plastic bottles, MOF is $M_x(BDC)_y$, wherein BDC=benzenedicarboxylate, and EG is ethylene glycol. The product of step 1 is a MOF/$SiO_2$ intermediate. The mixture $M_wSi_xO_y(OH)_z$+PET (or ligand) is used in step 1 to form the MOF/$SiO_2$ intermediate. The mixture $M_wSi_xO_y(OH)$+PET (or ligand) may also be referred to herein as the MOF/$SiO_2$ precursor.

The type and amount/concentration of metal M is affected by the metal silicate precursor that is used. If a specific type or amount of metal is desired for an end-use application, a metal silicate precursor having the desired properties can be used in preparing the MOF/$SiO_2$ intermediate. Similarly, if an amount or concentration of silicon is desired for a particular end-use application, a metal silicate precursor having properties that will lead to the goal silicon concentration can be selected to provide a MOF/$SiO_2$ intermediate having the chosen concentration properties. While PET is used as the organic ligand in this example, alternative organic ligands can be used.

In certain embodiments, the nano-crystalline metal organic framework is present only within the mesopores or void spaces of the mesoporous material and homogeneously dispersed within the mesopores or void spaces of the mesoporous material. Additionally, in other embodiments, $SiO_2$ (mesoporous material) is embedded within a MOF framework in the nanostructured MOF/$SiO_2$ intermediate. For example, this may be the case when using mineral metal silicates as a precursor.

As used herein, "disposed on", "embedded", "confined" or "impregnated" describes being completely or partially filled throughout, saturated, permeated and/or infused. In one embodiment, greater than 10% of the pore spaces of the mesoporous material is covered by the nano-crystalline MOF, including, for example, values of greater than 15%, greater than 20%, greater than 25%, greater than 30%, greater than 35%, greater than 40%, greater than 45%, greater than 50%, greater than 55%, greater than 60%, greater than 65%, greater than 70%, greater than 75%, greater than 80%, greater than 85%, greater than 90%, greater than 95%, greater than 96%, greater than 97%, greater than 98%, greater than 99%.

In certain embodiments, the nano-crystalline metal organic framework is substantially present only within the mesopores or void spaces of the mesoporous material and homogeneously dispersed within the mesopores or void spaces of the mesoporous material. Greater than 60% of the nano-crystalline MOF may be located in the pore spaces and not at the surface of the mesoporous material, including, for example, greater than 70%, greater than 75%, greater than 80%, greater than 85%, greater than 90%, greater than 95%, greater than 96%, greater than 97%, greater than 98%, and greater than 99%. As used herein, "homogeneous dispersion" refers to dispersion in a similar or the same manner and may refer to uniform structure and composition. The hybrid material intermediate may be substantially free of MOF aggregates or an amorphous MOF phase and substantially comprises MOF particles as a nano-crystalline phase dispersed in a uniform manner throughout the pore spaces of the mesoporous material.

The method may further comprise drying at least one selected from the group consisting of the impregnated mesoporous salt material, the impregnated mesoporous acid material, the impregnated mesoporous metal organic framework precursor, and the hybrid material intermediate at a temperature in the range of 25-160° C., including, for example, ranges of 85-150° C., 90-140° C., 100-130° C., or about 120° C. under a vacuum and with a drying time of up to 24 hours, including, for example, ranges of 0.5-18 hours, 1-12 hours, 1.5-6 hours, or about 2 hours.

The method may further comprise washing the hybrid material intermediate with distilled water or other polar protic solvent, and extracting water from the hybrid material intermediate in a Soxhlet system recycling methanol or other polar protic solvent.

The mesoporous material may be at least one selected from the group consisting of a mesoporous metal oxide (aluminum oxide, cerium oxide, titanium oxide, zirconium oxide, magnesium oxide, etc.), a mesoporous silica, a mesoporous carbon, a mesoporous polymer, a mesoporous silicoalumina (zeolite), a mesoporous organosilica, and a mesoporous aluminophosphate, etc.). As used herein, a mesoporous material may refer to a material containing pores with diameters between 2-200 nm, porous materials are classified into several kinds by their pore size. For example, mesoporous materials may refer to a porous material containing pores with diameters between 50-200 nm. The mesoporous material may have a percent porosity of greater than 10%, greater than 20%, greater than 25%, greater than 30%, greater than 35%, or greater than 40%. In preferred embodiments, the mesoporous material comprises silica. For example, the mesoporous material comprises silica, metal silicates, or organosilica.

The organic ligand of the organic ligand salt can be at least one selected from the group consisting of polycarboxylate ligands, azaheterocyclic ligands, and derivatives thereof. As used herein, "ligand" refers to a mono-dentate or polydentate compound that bind a transition metal or a plurality of transition metals, respectively. Generally a linking moiety comprises a substructure covalently linked to an alkyl or cycloalkyl group, comprising 1 to 20 carbon atoms, an aryl group comprising 1 to 5 phenyl rings, or an alkyl or aryl amine comprising alkyl or cycloalkyl groups having from 1 to 20 carbon atoms or aryl groups comprising 1 to 5 phenyl rings, and in which a linking cluster (e.g., a multi-dentate function groups) are covalently bound to the substructure. A cycloalkyl or aryl substructure may comprise 1 to 5 rings that comprise either of all carbon or a mixture of carbon with nitrogen, oxygen, sulfur, boron, phosphorus, silicon and/or aluminum atoms making up the ring. Typically the linking moiety will comprise a substructure having one or more carboxylic acid linking clusters covalently attached.

The organic ligand can be any multidentate organic molecule utilized for MOF or coordination polymer synthesis. For example, the organic ligand can be terephthalic acid, which is relatively inexpensive and versatile. In fact, it can be used with many metal precursors, including Al, Zn, Mg, Ca, and Fe. In preferred embodiments, PET-derived terephthalic acid from a recycling source is used.

The organic ligand of the organic ligand salt may be at least one selected from the group consisting of, terephthalate, benzene-1,3,5-tricarboxylate, 2,5-dioxibenzene dicarboxylate, biphenyl-4,4'-dicarboxylate and derivatives thereof. The organic ligand of the organic ligand salt may be at least one selected from the group consisting of imidazolate, pyrimidine-azolate, triazolate, tetrazolate and derivatives thereof.

In an environmentally-friendly embodiment, the organic ligand may comprise polyethylene terephthalate (PET) derived from recycled plastic bottles. In fact, the organic ligand terephthalic acid can be generated in-situ from PET derived from recycled plastic bottle waste without need of a basic pre-treatment to release terephthalic acid as reported in literature. The recycling of plastic waste is a major societal problem. A significant amount of all plastics produced are not recycled. Ubiquitous plastic bottles are composed of a non-biodegradable polymer polyethylene terephthalate (PET), which makes up 10% of plastic production. Downstream products from PET recycling are of low value, making the process (by physical or chemical treatment) less economically attractive when compared to the low price of virgin PET. Moreover, the current recycling of PET has some environmental issues due to the presence of contaminants. Thus, it is highly desirable to use PET derived from plastic bottles in the method described herein.

The metal of the metal precursor may be at least one transition metal selected from the group consisting of Mg, V, Cr, Mo, Zr, Hf, Mn, Fe, Co, Cu, Ni, Zn, Ru, Al, and Ga. As used herein, "metal ion" is selected from the group consisting of elements of groups Ia, IIa, IIIa, IVa to VIIIa and IB to VIb of the periodic table of the elements. In certain other embodiments, the metal precursor may comprise clusters of metal oxides.

In an environmentally-friendly, sustainable embodiment, the metal and the silica precursor may be provided by relatively inexpensive metal-silica precursor. The metal-silica precursor may comprise a metal oxide confined in or supported on porous silica or a metal silicate.

The metal oxides confined in or supported on porous silica are considered to be synthetic precursors. Silica supports can include any porous silica material, including regular or non-regular porosity that can support metal oxide nanoparticles within the cavities thereof. Suitable metal oxides for confinement within the porous silica include, without limitation, Zn, Al, Ca, Fe and Mg. The use of synthetic precursor can lead to higher Si content in the resulting SiC materials and can provide more control over the resulting SiC nanostructure.

Metal silicates are considered to be mineral precursors. Silicate minerals are rock-forming minerals made up of silicate groups and are the largest and most important class of minerals and make up approximately 90% of the Earth's crust. A silicate mineral is generally an ionic compound whose anions comprise predominantly silicon and oxygen atoms in which a silicon atom is the center of an ideal tetrahedron, whose corners are four oxygen atoms covalently bound to it. Mineral metal silicates often comprise orthosilicate anions $SiO_4^{4-}$ and metal cations typically found in metal organic frameworks, especially metal cations such as Al, Mg, Fe and Ca. Zn is not typically found in these minerals.

Phyllosilicates or sheet silicates are useful in the methods described herein.

Phyllosilicates are formed by parallel sheets of silicate tetrahedron with $Si_2O_5$. This family of mineral silicates exhibits layered structures that facilitate the described methods and also affect the resulting $MOF/SiO_2$ nanostructures. Suitable phyllosilicates include, without limitation:

Serpentine subgroup: Antigorite—$Mg_3Si_2O_5(OH)_4$, Chrysotile—$Mg_3Si_2O_5(OH)_4$ (asbestos), and Lizardite—$Mg_3Si_2O_5(OH)_4$ Clay minerals group: Halloysite—$Al_2Si_2O_5(OH)_4$, Kaolinite—$Al_2(OH)_4Si_2O_5$, Illite—$(K,H_3O)(Al,Mg,Fe)_2(Si,Al)_4O_{10}[(OH)_2, (H_2O)]$, Montmorillonite—$(Na,Ca)_{0.33}(Al,Mg)_2Si_4O_{10}(OH)_2 \cdot nH_2O$, Vermiculite—$(MgFe,Al)_3(Al,Si)_4O_{10}(OH)_2 \cdot 4H_2O$, Talc—$Mg_3Si_4O_{10}(OH)_2$, Sepiolite—$Mg_4Si_6O_{15}(OH)_2 \cdot 6H_2O$, Palygorskite (or attapulgite)—$(Mg,Al)_2Si_4O_{10}(OH).4(H_2O)$, and Pyrophyllite—$Al_2Si_4O_{10}(OH)_2$ Mica group: Biotite—$K(Mg,Fe)_3(AlSi_3)O_{10}(OH)_2$, Fuchsite—$K(Al,Cr)_2(AlSi_3O_{10})(OH)_2$, Muscovite—$KAl_2(AlSi_3)O_{10}(OH)_2$, Phlogopite—$KMg_3(AlSi_3)O_{10}(OH)_2$, Lepidolite—$K(Li,Al)_{2-3}(AlSi_3)O_{10}(OH)_2$, Margarite—$CaAl_2(Al_2Si_2)O_{10}(OH)_2$, and Glauconite—$(K,Na)(Al,Mg,Fe)_2(Si,Al)_4O_{10}(OH)_2$ In embodiments, it is preferred to use minerals with relatively high Si content, for example, greater than 50 wt %. The use of mineral materials can advantageously impact the cost of the resulting SiC, especially if waste recycled precursors: asbestos and coal ash are utilized. However, mineral materials may contain lower concentrations of Si than the synthetic precursors.

Waste feedstocks, such as asbestos or fly ash, are metal silicates. Asbestos is the generic commercial designation for a group of naturally occurring mineral silicate fibers of the serpentine and amphibole series. These include the serpentine mineral chrysotile (also known as 'white asbestos'), and the five amphibole minerals—actinolite, amosite (also known as 'brown asbestos'), anthophyllite, crocidolite (also known as 'blue asbestos'), and tremolite. The silicate tetrahedron ($SiO_4$) is the basic chemical unit of all silicate minerals. The number of tetrahedra in the crystal structure and how they are arranged determine how a silicate mineral is classified. Serpentine silicates are classified as 'sheet silicates' because the tetrahedra are arranged to form sheets. Amphibole silicates are classified as 'chain silicates' because the tetrahedra are arranged to form a double chain of two rows aligned side by side. Magnesium is coordinated with the oxygen atom in serpentine silicates. In amphibole silicates, cationic elements such as aluminium, calcium, iron, magnesium, potassium, and sodium are attached to the tetrahedra. Amphiboles are distinguished from one another by their chemical composition.

The structure of silicate minerals may be fibrous or non-fibrous. The terms 'asbestos' or 'asbestiform minerals' refer only to those silicate minerals that occur in polyfilamentous bundles, and that are composed of extremely flexible fibers with a relatively small diameter and a large length. Asbestos minerals with crystals that grow in two or three dimensions and that cleave into fragments, rather than breaking into fibrils, are classified as silicate minerals with a 'non-asbestiform' habit.

Fly ash is primarily a composite of oxides of silicon, aluminum iron and calcium. Magnesium, potassium, sodium, titanium, and sulfur are also present to a lesser degree. Suitable waste feedstocks include, without limitations, asbestos, fly ash and other coal combustion residues.

Halloysite is a natural clay mineral that is a silicon-containing nanomaterial widely present in nature. In terms of chemical composition, halloysite has a similar $SiO_2/Al_2O_3$ ratio to kaolinite, dickite, pearlite, etc., but the mineral has a hollow nano-tubular structure, and the inner wall of the tube is an aluminum octahedral layer. The outer wall of the tube is a silicon tetrahedral layer. Halloysite is made of a single or a plurality of aluminosilicate sheets. The tube has an outer diameter of about 10-100 nm, an inner diameter of about 5-20 nm, and a length of about 0.5-50 μm. The halloysite surface has very similar surface properties to $SiO_2$, while the inner layer properties are similar to those of $Al_2O_3$.

Thus, the method described herein may be used to provide value for waste feedstocks, which can have a positive environmental and economic impact by reducing use of virgin resources, lowering greenhouse gas emissions, reducing cost of waste disposal, and lowering costs for high value products (e.g., anode material for LIBs).

In an embodiment, the metal organic framework may be at least one selected from the group consisting of MIL-101, MIL-100, MIL-53, MOF-74, UiO-66, UiO-67, ZIF-8, ZIFs, HKUST-1, M2(dobpdc), NU-1000, PCN-222, PCN-224, and derivatives thereof. Using the methods described herein, different MOF structures can be obtained depending on the metals present in the metal source (e.g., Zn, Al, Ca, Fe and Mg) and the organic ligand (e.g., terephthalic acid, trimesic acid, 2-methylimidazole, and 2,5-dioxibenzene dicarboxylate). For example, PET-derived terephthalic acid (BDC) can be used to obtain the following MOFs: Al(BDC) or MIL-53, Zn(BDC) or MOF-5, Mg(BDC), Ca(BDC) and Fe(BDC). The MOFs may form a coordination polymer or an unknown crystalline phase.

As used herein, a metal organic framework may refer to compounds consisting of metal ions or clusters coordinated to organic ligands to form one-, two- or three-dimensional structures, with the special feature of porosity. More formally, a metal organic framework is a coordination network with organic ligands containing potential voids. The nanocrystalline MOF can have a percent porosity of greater than 10%, greater than 20%, greater than 25%, greater than 30%, greater than 35%, or greater than 40%.

MOFs are composed of two major components: a metal ion or cluster of metal ions and an organic molecule often termed a linker. The organic units are typically mono-, di-, tri-, or tetravalent ligands. The choice of metal and linker will dictate the structure and hence properties of the MOF. For example, the metal's coordination preference influences the size and shape of pores by dictating how many ligands can bind to the metal and in which orientation. Moreover, the choice of mesoporous silica will affect the nanostructure and physicochemical properties of the hybrid MOF/$SiO_2$.

For example, for the exemplary MOF/$SiO_2$ intermediate material, it may be desired to have a material wherein the concentration of $SiO_2$ is relatively high, for example, greater than 20%, greater than 30%, greater than 40%, greater than 50%, greater than 60%, greater than 70%, greater than 80%, or greater than 90%. Accordingly, a metal silicate precursor with a high concentration of silicate can be chosen to produce an intermediate material having a high concentration of $SiO_2$. Similarly, it may be desired to have an intermediate material wherein the concentration of carbon is relatively high, for example, greater than 10%, greater than 20%, greater than 30% or greater than 40%. Accordingly, the amount and kind of organic ligand can be chosen to produce an intermediate material having a high concentration of carbon.

The intermediate material has a weight percentage of the metal organic framework in the range of 5-50% relative to the total weight of the intermediate material, including, for example, ranges of 15-45%, 25-40%, 30-35%, or at least 20%, at least 25%, at least 30%, at least 35%, at least 40%, and at least 45%.

The hybrid material intermediate may comprise mesopores with an average diameter in the range of 2-200 nm, including, for example, ranges of 4-45 nm, 6-40 nm, 20-80 nm, 30-90 nm, and 100-200 nm, and micropores with an average diameter in the range of 0.5-5.0 nm, including, for example, ranges of 1.0-4.5 nm and 2.0-4.0 nm. The mesopores, the micropores, or both can be monodisperse having a coefficient of variation of less than 10%, less than 8%, less than 6%, less than 5%, less than 4%, and less than 3%. The hybrid material intermediate can have a percent porosity of greater than 10%, greater than 20%, greater than 25%, greater than 30%, greater than 35%, and greater than 40%.

Step 2—Conversion of the MOF/SiO$_2$ Intermediate to a Nanostructured Silicon Carbonaceous Composite Material.

The metal organic frameworks/silica (MOF/SiO$_2$) hybrid material intermediates prepared in Step 1 are converted into carbonaceous silicon composite materials in Step 2 using magnesiothermic reduction. In Step 2, the MOF serves as the precursor of the resulting carbonaceous species (graphite and carbide) and silica serves as the source of silicon.

As shown above, in an exemplary embodiment, Step 2 can be schematically illustrated as follows: MOF/SiO$_2$+Mg→C/Si+MgO+MO$_x$.

In magnesiothermic reduction, the MOF/SiO$_2$ hybrid material intermediate is exposed to Mg vapors at a relatively high temperature, ranging from about 600° C. to about 800° C. For example, the temperature may range from about 600° C.-750° C. or 600° C.-700° C. Exposure of the hybrid material intermediate to Mg vapors leads to the formation of Si nanoparticles by Mg reduction of the SiO$_2$ support and nanostructured and microporous graphitic carbon and/or silicon carbide (carbonaceous silicon composite material) species originated by MOF carbonization.

In addition, the well-defined nanostructure of the MOF/SiO$_2$ hybrid material intermediate provides a template for the carbonaceous silicon composite material, which enables the improved performance of the resulting anode materials in lithium ion batteries (LIB).

MOF-derived highly-stable graphitic carbon and/or silicon carbide composite material can improve both long-term stability and energy density of LIB by enabling Si nanoparticle stabilization and volume expansion accommodation, protection of Si surface when exposed to the electrolyte, improved thermal and electrical conductivity and enhanced Li adsorption capacity and diffusivity through the composite material.

The following Examples further illustrate the disclosure and are not intended to limit the scope. In particular, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

EXAMPLES

Figure 2:
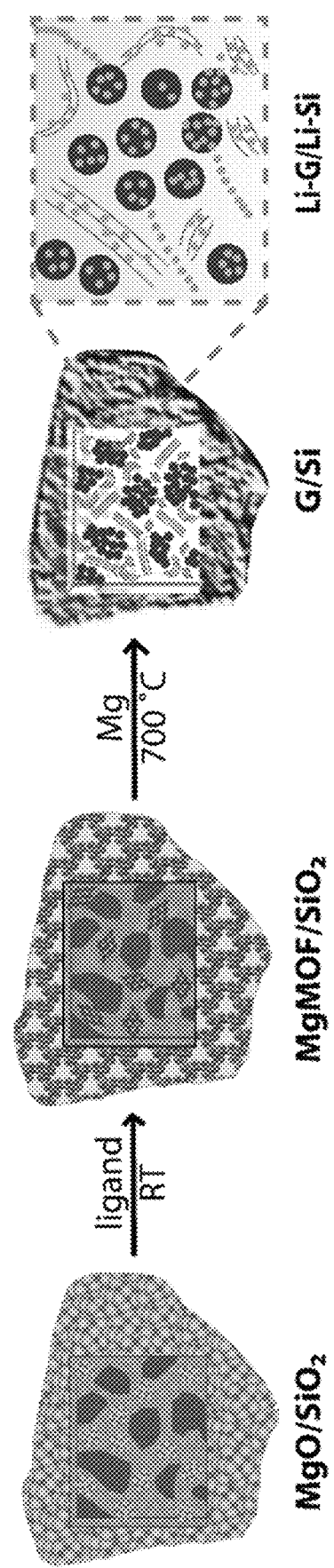
FIG. 2 is a schematic representation of a process for producing an exemplary silicon carbonaceous composite material.
Figure 3A:
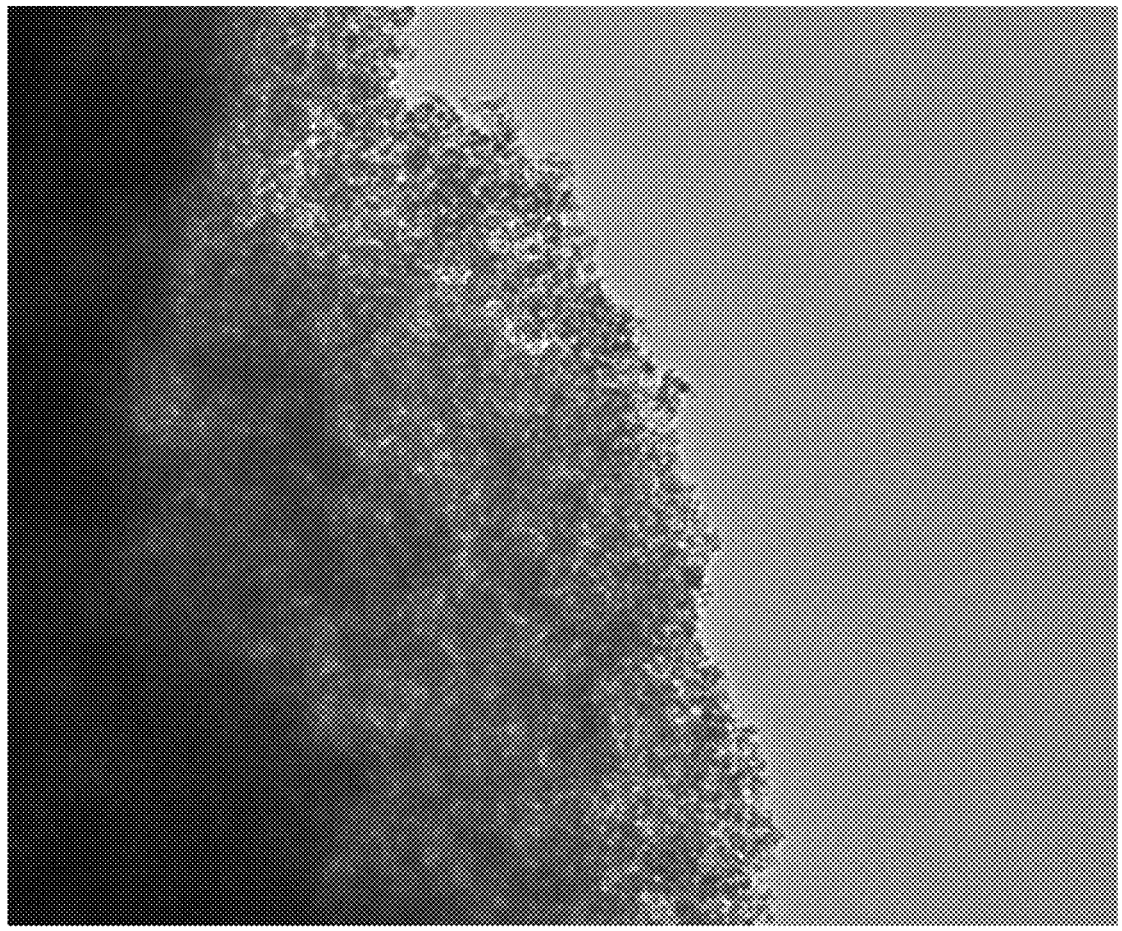
FIGS. 3A, 3B, and 3C are TEM, XRD and FTIR, respectively, of the nanostructured Si/SiC composite material produced in Example 1.
Figure 3B:
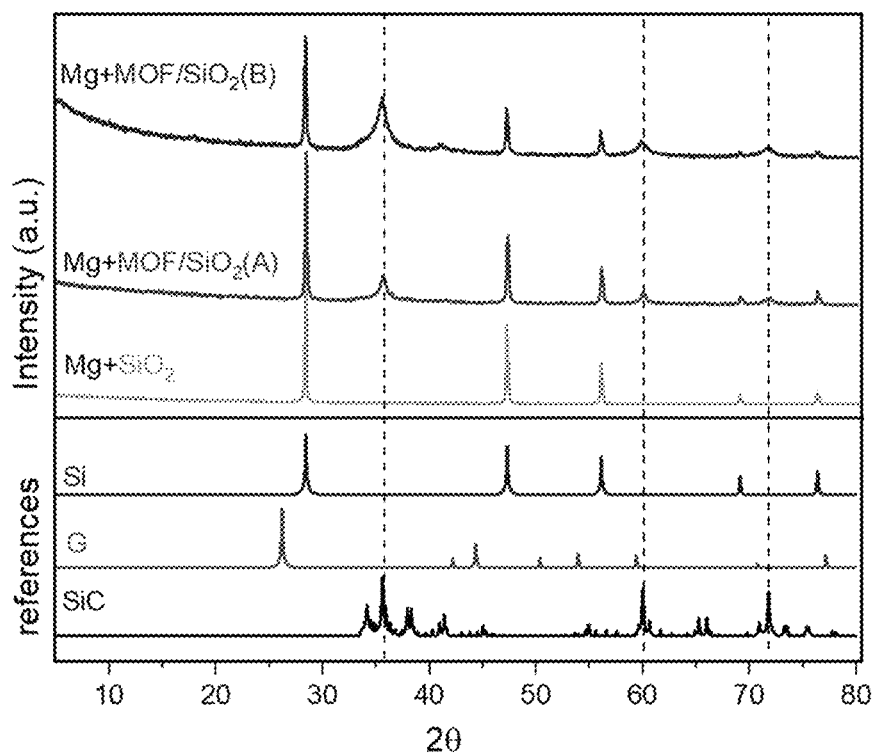
Figure 3C:
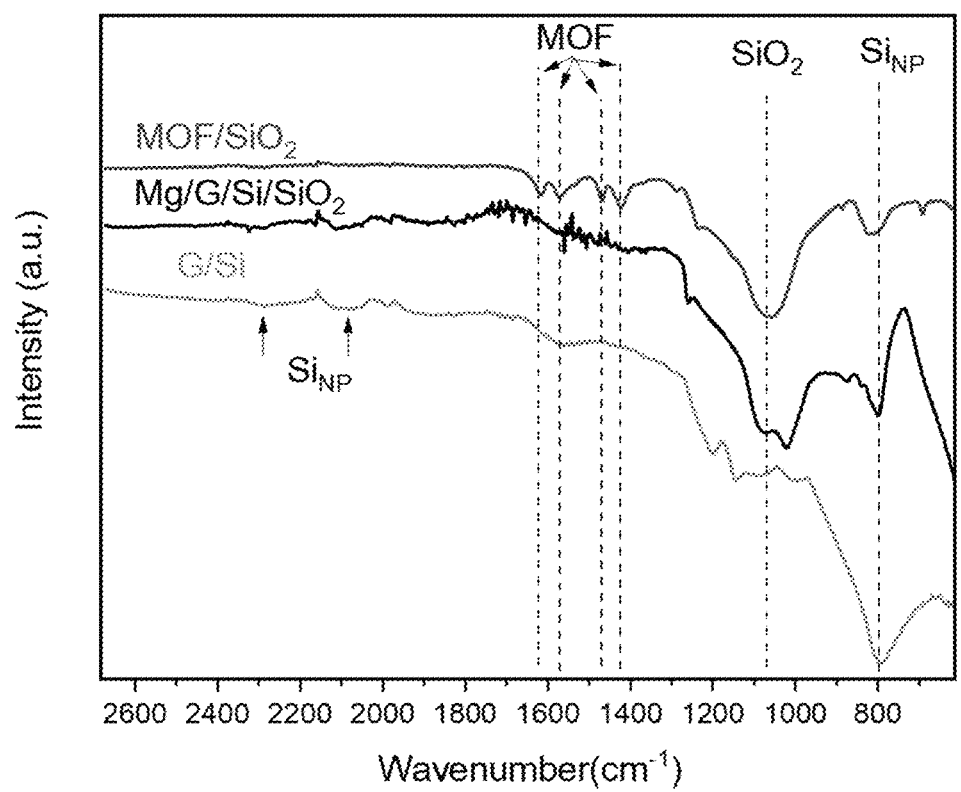
Figure 4A:
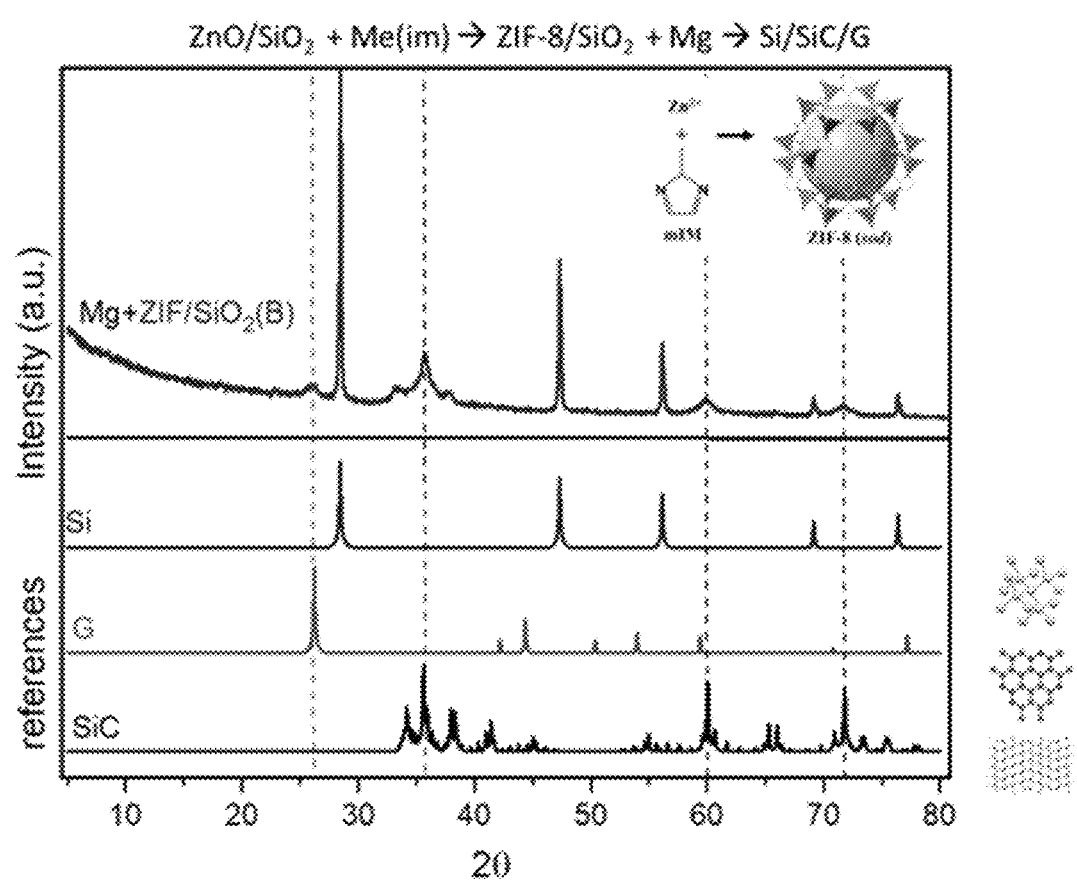
FIGS. 4A and 4B are XRD patterns of the resulting nanostructured Si/SiC/G composite materials prepared from ZnO/SiO$_2$ using 2-methylimidazole (Me(im)) as a commercially available ligand, and recycled PET bottle as waste ligand precursor, respectively.
Figure 4B:
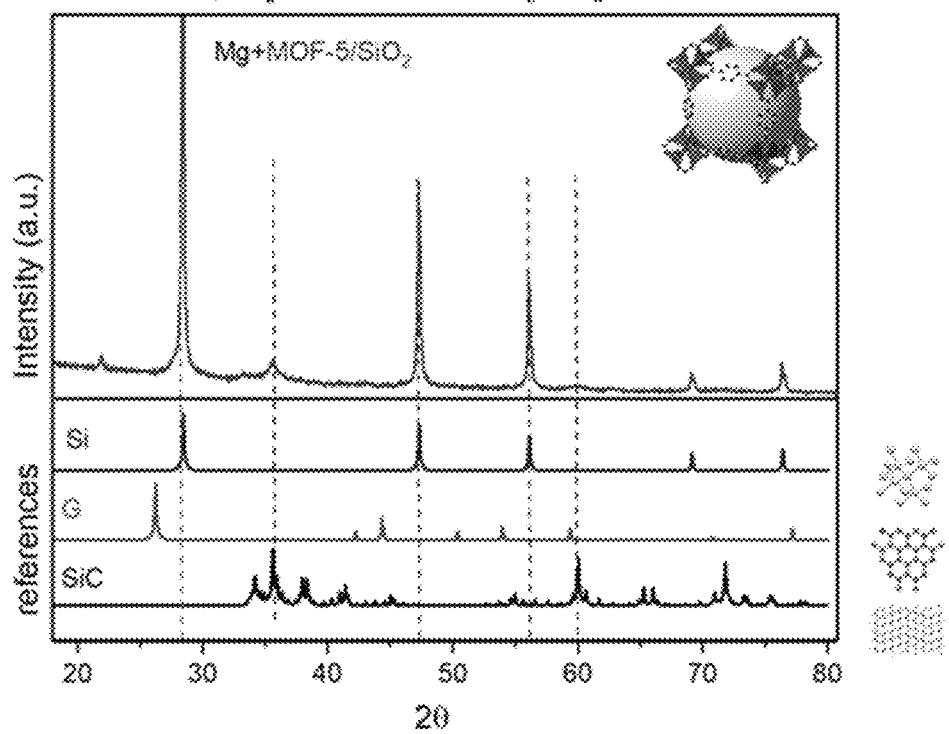

Example 1. Si-Rich Carbonaceous Composite Material from Synthetic Metal Oxide/SiO$_2$ Hybrid Material Intermediate FIG. 2 provides a schematic representation of an exemplary process for producing an exemplary carbonaceous silicon composite material. A MgO/SiO$_2$ hybrid material intermediate was exposed to Mg vapors at 700° C., which simultaneously lead to the formation of 1) small Si nanoparticles by Mg reduction of the SiO$_2$ support (2Mg+SiO$_2$→2MgO+Si) and 2) nanostructured and microporous graphitic carbon and/or silicon carbide species originated by the MOF carbonization. In addition, well-defined nanostructure of MOF/SiO$_2$ hybrid material intermediate served as template for the carbonaceous silicon composite material replica product. FIGS. 3A, 3B, and 3C are TEM, XRD and FTIR, respectively, of the resulting nanostructured Si/SiC composite material showing small Si nanocrystals and the presence of Si and SiC crystalline phase. FIGS. 4A and 4B are XRD of the resulting nanostructured Si/SiC/G composite material prepared from ZnO/SiO$_2$ using (A) 2-methylimidazole (Me(im)) as commercially available ligand and (B) recycled PET bottle as waste ligand precursor.

Example 2. Si-Rich Carbonaceous Composite Materials from Mineral Halloysite Clay Precursor and Recycled PET Bottle In Example 2, similar nanostructured Si-rich carbonaceous composite materials to those produced in Example 1 were obtained when synthetic metal silicate and organic ligand were substituted by mineral clay (halloysite) and recycled PET bottles. The substitution and favorable results demonstrate the generality of the method.

Figure 5C:
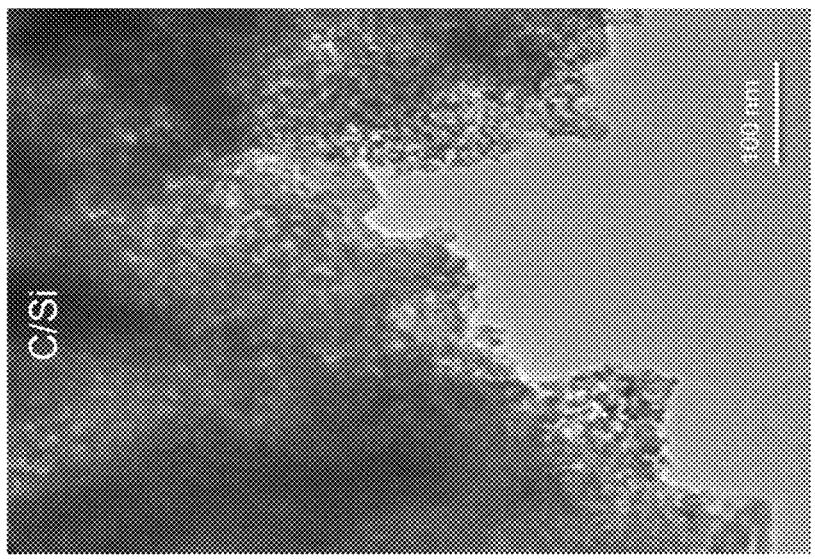
FIGS. 5A, 5B, and 5C are TEM images for A) the mineral clay precursor of Example 2, B) the MOF/SiO$_2$ intermediate obtained upon reaction with recycled PET bottle of Example 2, and C) the resulting nanostructured Si/C composite material of Example 2.
Figure 5B:
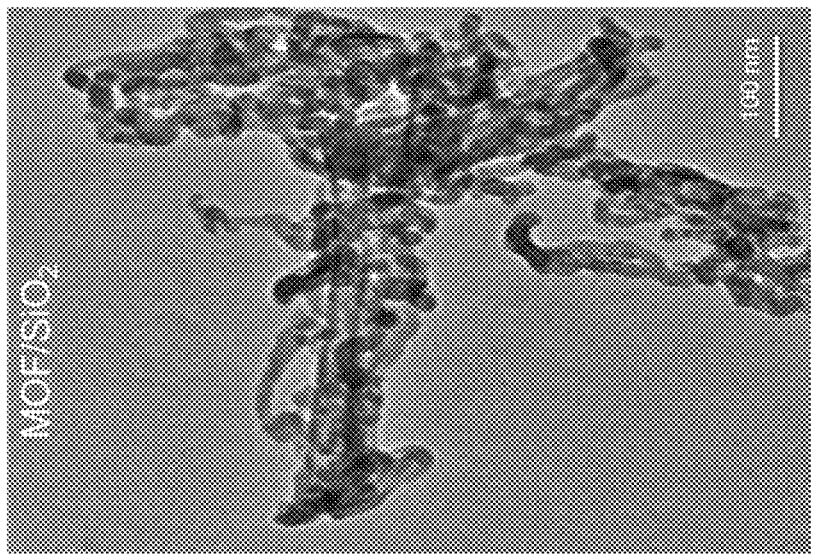
Figure 5A:

FIGS. 5A, 5B, and 5C are TEM images for A) the mineral clay precursor, B) the MOF/SiO$_2$ intermediate obtained upon reaction with recycled PET bottle, and C) the resulting nanostructured Si/C composite material prepared via magnesiothermic reduction having small Si nanocrystals and the presence of Si and SiC crystalline phase.

Example 3. Si-Rich Carbonaceous Composite Materials from Waste Chrysotile Asbestos Precursor and Recycled PET Bottle In Example 3, similar nanostructured Si-rich carbonaceous composite materials to those produced in Example 1 were obtained when synthetic metal silicate and organic ligand were substituted by waste asbestos (chrysotile) and recycled PET bottles. The substitution and favorable results demonstrate the generality of the method.

Figure 6C:
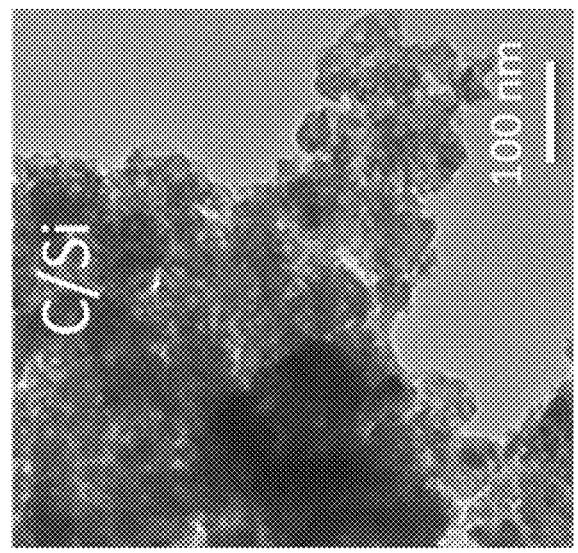
FIGS. 6A, 6B, and 6C are TEM images for A) the asbestos precursor of Example 3, B) the MOF/SiO$_2$ intermediate obtained upon reaction with recycled PET bottle of Example 3, and C) the resulting nanostructured Si/C composite material of Example 3.
Figure 6B:
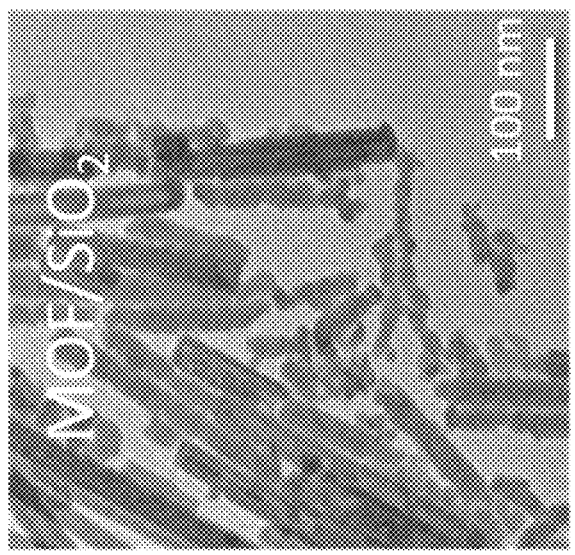
Figure 6A:
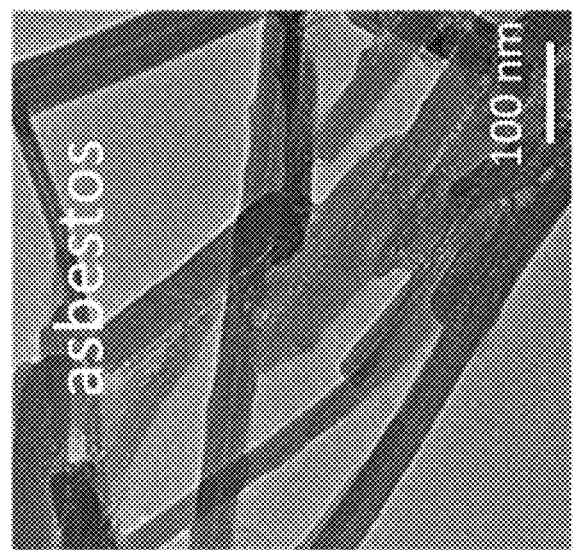

FIGS. 6A, 6B, and 6C are TEM images for A) the waste chrysotile asbestos, B) the MOF/SiO$_2$ intermediate obtained upon reaction with recycled PET bottle, and C) the resulting nanostructured Si/C composite material prepared via magnesiothermic reduction having small Si nanocrystals and the presence of Si and SiC crystalline phase.

Any patents or publications mentioned in this specification are indicative of the levels of those skilled in the art to which the invention pertains. These patents and publications are herein incorporated by reference to the same extent as if each individual publication was specifically and individually indicated to be incorporated by reference.

The invention claimed is:

1. A method of making a nanostructured silicon carbonaceous composite material comprising
   contacting a metal-silica precursor with an organic ligand in water to form an aqueous mixture, wherein the organic ligand comprises terephthalic acid derived from polyethylene terephthalate (PET), wherein the metal-silica precursor comprises a metal oxide confined in silica or a metal silicate,
   heating the aqueous mixture at a temperature ranging from about 25° C. to 300° C. thereby forming a nano-crystalline metal organic framework/silica intermediate material, and
   contacting the nano-crystalline metal organic framework/silica intermediate material with magnesium at a temperature ranging from about 600° C. to 800° C. thereby forming the nanostructured silicon carbonaceous composite material.

2. The method of claim 1, wherein the metal oxide confined in silica is synthetic metal oxide.

3. The method of claim 1, wherein the metal silicate is mineral metal silicate.

4. The method of claim 3, wherein the mineral metal silicate comprises halloysite or kaolinite.

5. The method of claim 3, wherein the mineral metal silicate comprises asbestos, fly ash, or bottom ash.

6. The method of claim 1, wherein the metal-silica precursor is selected such that the resulting nanostructured silicon carbonaceous composite material has a silicon content greater than 50 wt %.

7. The method of claim 1, wherein the metal-silica precursor and organic ligand are also contacted with organic solvent.

8. The method of claim 7, wherein the organic solvent comprises methanol, ethanol, tetrahydrofuran, N,N-dimethylformamide, N,N-dimethylacetamide, acetonitrile, or acetone.

9. The method of claim 1, wherein the temperature for heating the aqueous mixture ranges from about 25° C. to about 250° C.

\* \* \* \* \*